Dec. 4, 1956   J. C. BYSTRICKY   2,772,750
COALESCING FITTING
Filed May 12, 1954

Inventor
Joseph C. Bystricky
By Ahlberg, Wupper & Gradolph
Attorneys.

United States Patent Office 2,772,750
Patented Dec. 4, 1956

2,772,750

COALESCING FITTING

Joseph C. Bystricky, Chicago, Ill., assignor to Stewart-Warner Corporation, Chicago, Ill., a corporation of Virginia Application May 12, 1954, Serial No. 429,175

3 Claims. (Cl. 183—75)

The invention relates generally to lubricating apparatus, and more particularly to a fitting capable of coalescing oil particles conveyed to the fitting as an aerosol.

In lubricating systems of the type shown in the patents to Gothberg et al. Nos. 2,610,700 and 2,642,156, an aerosol of oil is generated and conveyed through a pipe of relatively large cross sectional area to the parts to be lubricated. In some instances the aerosol may be applied directly to the part to be lubricated, but in most instances it is desirable to coalesce the oil particles, which are but a few microns in diameter, so that the oil may flow to the bearing as a liquid and not flow through the bearing to the atmosphere with the air.

The object of the present invention is to provide an improved, simplified, and inexpensive fitting to cause nearly all of the oil supplied to the fitting as an aerosol to coalesce.

Other objects will appear from the following description, reference being had to the accompanying drawings, in which Fig. 1 is a central vertical cross sectional view of the improved fitting, shown to an enlarged scale;

Figure 1:
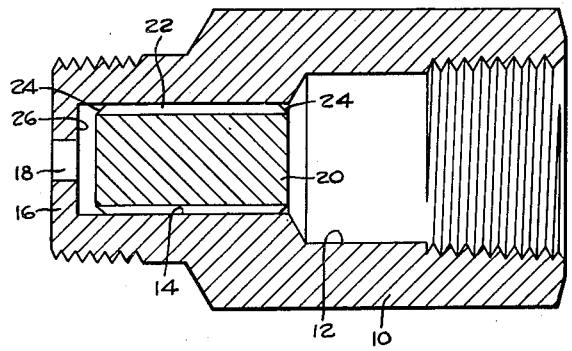
Figure 2:
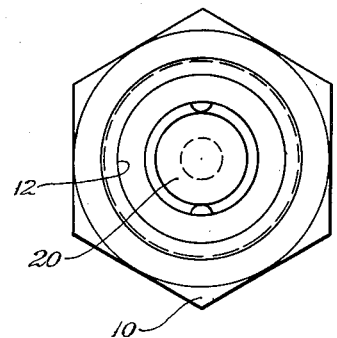
Fig. 2 is a left-hand view thereof.
Figure 3:
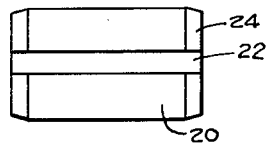
Fig. 3 is an enlarged elevational view of the plug portion of the fitting.

The fitting comprises a body 10 having a counterbore 12, a portion of which is threaded or otherwise conformed for attachment to a conduit through which the oil aerosol is supplied. Similarly, the other end of the fitting is threaded or otherwise conformed for attachment to a bearing or other part to be supplied with the lubricant.

A smaller diameter bore 14 coaxial with the counterbore 12 has its outer end partially closed by a baffle shoulder 16 provided with an outlet opening 18. A plug 20 has a press fit in the bore 14 and is provided with one or more longitudinal grooves 22 along its external surface. The ends of the plug are preferably chamfered, as indicated at 24, to facilitate pressing the plug into the bore.

Figure 4:
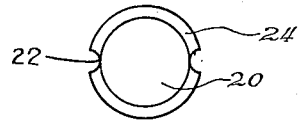
Fig. 4 is an end view thereof.

As best shown in Fig. 4, these grooves are preferably substantially semi-circular in cross section, and with the walls of bore 14, form passageways having a cross sectional area of an order somewhat less than one-thousandth of a square inch, which is less than one one-hundredth of the cross sectional area of the bore 12.

In the use of the fitting, the aerosol, or oil mist as it is sometimes called, is supplied to the fitting at a pressure in the order of 10 p. s. i., and flows through the conduit system to the fitting at a moderate velocity so that there is practically no settling of the oil particles in the conduit system. However, at the coalescing fitting the velocity through the groove or grooves 22 is greatly increased by a factor related to the ratio of the cross sectional area of the conduit with respect to the cross sectional area of the groove or grooves 22. The aerosol rapidly flowing from the ends of the grooves 24 impinges against the inner surface 26 of the baffle shoulder 16, so that the oil particles will wet the surface and coalesce, and the oil will flow as a liquid through the outlet 18 to the bearing or other part to be supplied with lubricant.

The operation of this fitting may be best understood by taking into consideration the fact that the tiny oil particles are maintained in spherical shape due to the forces of surface tension. As stated above, the particles are a few microns in diameter so that the surface tension is great compared to the volume of the particles. The particles may thus be likened to an orange having a relatively strong skin, so that the orange may be handled and rolled about without any serious damage, but will be fractured if the orange is thrown against a wall with considerable velocity.

In a manner similar to this the kinetic energy or momentum of the oil particles emitted at high velocity from the end of the groove or grooves 22 is sufficient to overcome the surface tension, and as a result the oil particle does not rebound from the surface 26 but instead splashes thereagainst and "wets" the same. The film of oil thus formed on the surface 26 is caused to flow through the outlet 18 to a bearing, due to the friction of the air passing over the surface of the film.

It has been found that substantially all the oil from the aerosol will coalesce in the fitting and that only a very small percentage will be carried as an aerosol by the air discharged through the outlet 18. This small proportion probably consists of extremely small particles one micron or less in diameter.

The plug 20 may have one groove 22 therein, or as many as six equally spaced grooves, depending upon the oil requirements of the part being lubricated. Thus with the same size body the fittings of different capacities may be made merely by pressing in a plug having the desired number of grooves. The end of the plug 20 is sufficiently close to the surface 26 that there will be no substantial loss of velocity of the oil particles, so that they will travel through the transversely flowing air and impinge upon the surface 26 with sufficient momentum to cause their coalescence upon this surface. Due to the small size of the groove the kinetic energy of the particles will be multiplied by about ten thousand. This spacing must, however, be sufficiently large that the velocity of the air flow is sufficiently low that the oil will not be scrubbed from the surface 26 and reentrained by the air as an aerosol.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A coalescing fitting for use in an oil aersol lubricating system comprising, a body having an axial large diameter bore therein and having a radially inwardly extending flange at one end of the bore defining an outlet opening therefrom opening outwardly along the extended axis of the bore, and a generally cylindrical plug having at least one groove in its cylindrical surface generally parallel to the axis of the plug and open longitudinally outward at opposite ends of the plug, the groove having a cross sectional area which is only a very small fraction of the cross sectional area of the bore, said plug having a press fit in the bore and having one end spaced a short distance from the inner surface of the flange on the body.

2. A coalescing fitting for use in an oil aerosol lubricating system comprising, a body having an axial large diameter bore therein and having a radially inwardly extending flange at one end of the bore defining an outlet opening therefrom open outwardly along the extended axis of the bore, the flange defining a radial coalescing surface thereon facing the bore, and an elongated plug having a transverse configuration conforming to the transverse shape and size of the bore, the plug defining a plurality of grooves in its exterior surface generally parallel to the axis of the plug and open outwardly at opposite ends of the plug, the grooves having cross-sectional areas which are only very small fractions of the cross-sectional area of the bore, said plug having a press fit in the bore and having one end spaced a short distance from the coalescing surface on the flange so that oil aerosol particles accelerated in passing through said grooves will impinge on said surface with sufficient velocity to coalesce thereon.

3. A coalescing fitting for use in an oil aerosol lubricating system comprising, in combination, an elongated body defining therein an axial bore of large diameter open outwardly at one end of the body, the other end of the body having thereon means forming an arcuate flange extending radially inward in relation to the surface of the bore and defining an outlet opening from the adjacent end of the bore opening outwardly along the extended axis of the bore, said flange defining a coalescing surface facing said bore in generally perpendicular relation to the axis thereof, and an elongated plug having a transverse configuration conforming to the transverse shape and size of the bore, the plug defining a groove in its exterior surface generally parallel to the longitudinal axis of the plug and open outwardly at opposite ends of the plug, the groove having a cross-sectional area which is only a very small fraction of the cross-sectional area of said bore, said plug having a press fit in said bore and having one end spaced a short distance from said coalescing surface on said flange.

References Cited in the file of this patent
UNITED STATES PATENTS

| | | |
|---|---|---|
| 1,461,045 | Paasche | July 10, 1923 |
| 2,043,944 | Baker et al. | June 9, 1936 |
| 2,101,214 | Everett | Dec. 7, 1937 |
| 2,642,156 | Gothberg et al. | June 16, 1953 |